United States Patent
John et al.

(10) Patent No.: US 12,203,600 B2
(45) Date of Patent: Jan. 21, 2025

(54) MAGNETO STRICTIVE ACTUATED PRESSURE REGULATOR MODULE FOR INFLATION SYSTEM

(71) Applicant: Goodrich Corporation, Charlotte, NC (US)

(72) Inventors: Poly John, Cochin (IN); Vasantha Kumara Jnanegowda, Bangalore (IN); Guangqing Shen, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 193 days.

(21) Appl. No.: 17/958,758

(22) Filed: Oct. 3, 2022

(65) Prior Publication Data
US 2024/0027030 A1    Jan. 25, 2024

(30) Foreign Application Priority Data
Jul. 22, 2022    (IN) .............................. 202241042047

(51) Int. Cl.
| | | |
|---|---|---|
| *F17C 13/06* | (2006.01) | |
| *F16K 17/16* | (2006.01) | |
| *F17C 13/04* | (2006.01) | |

(52) U.S. Cl.
CPC .......... *F17C 13/06* (2013.01); *F16K 17/1626* (2013.01); *F17C 13/04* (2013.01);
(Continued)

(58) Field of Classification Search
CPC ...... F17C 13/06; F16K 17/162; F16K 17/403; F16K 99/0053; F16K 31/02; Y10T 137/1774; Y10T 137/2213
(Continued)

(56) References Cited

U.S. PATENT DOCUMENTS 2,831,492 A * 4/1958 Bising .................. F16K 17/162
  137/69
3,357,677 A * 12/1967 Tasker .................... F16K 35/04
  251/106

(Continued)

FOREIGN PATENT DOCUMENTS

DE    69205290    5/1996
DE    102015216032    2/2017
(Continued)

OTHER PUBLICATIONS

European Patent Office, European Search Report dated Dec. 15, 2023 in Application No. 23185210.4.

*Primary Examiner* — Kenneth Rinehart
*Assistant Examiner* — Nicole Gardner
(74) *Attorney, Agent, or Firm* — SNELL & WILMER L.L.P.

(57) ABSTRACT

An actuator is disclosed herein. The actuator includes a drive body including a bottom surface, the bottom surface having a first side and an opposing second side, a magneto strictive material disposed within the drive body and contacting the first side of the bottom surface of the drive body, a solenoid disposed within the drive body and surrounding the magneto strictive material, a drive rod extending through the magneto strictive material and through the bottom surface of the drive body, and a spring disposed adjacent the second side of the bottom surface of the drive body, wherein the drive rod extends through the spring.

20 Claims, 5 Drawing Sheets

(52) U.S. Cl.
CPC ............... *F17C 2201/0109* (2013.01); *F17C 2205/0314* (2013.01); *F17C 2205/0326* (2013.01); *F17C 2205/0338* (2013.01)

(58) Field of Classification Search
USPC .................................................. 251/129.06
See application file for complete search history.

(56) References Cited

U.S. PATENT DOCUMENTS

| | | | |
|---|---|---|---|
| 5,411,225 | A | 5/1995 | Lannon et al. |
| 6,026,847 | A | 2/2000 | Reinicke et al. |
| 6,062,533 | A | 5/2000 | Kappel et al. |
| 9,849,994 | B2 | 12/2017 | Schmidt et al. |
| 9,915,360 | B2 | 3/2018 | Simeon et al. |
| 10,481,620 | B2 | 11/2019 | John et al. |
| 10,829,230 | B2 | 11/2020 | Schmidt et al. |
| 11,169,552 | B2 | 11/2021 | John et al. |
| 11,302,862 | B1 | 4/2022 | Miesner |
| 2002/0017319 | A1* | 2/2002 | Hintzman ............... F16K 31/56 137/71 |
| 2003/0057394 | A1 | 3/2003 | Makino |
| 2013/0000776 | A1* | 1/2013 | Johnson .............. B60C 23/0494 141/38 |
| 2018/0312279 | A1* | 11/2018 | Boyle ...................... G05D 7/03 |
| 2018/0341279 | A1 | 11/2018 | John et al. |
| 2020/0096123 | A1 | 3/2020 | Kamil |
| 2021/0181770 | A1* | 6/2021 | Zajac ...................... F17C 13/04 |

FOREIGN PATENT DOCUMENTS

| | | |
|---|---|---|
| EP | 1197702 | 11/2004 |
| EP | 1591656 | 3/2008 |

\* cited by examiner

MAGNETO STRICTIVE ACTUATED PRESSURE REGULATOR MODULE FOR INFLATION SYSTEM

CROSS-REFERENCE TO RELATED APPLICATIONS

This application claims priority to, and the benefit of, India Patent Application No. 202241042047 (DAS CODE: 9A2D), filed Jul. 22, 2022, and titled "MAGNETO STRICTIVE ACTUATED PRESSURE REGULATOR MODULE FOR INFLATION SYSTEM," which is incorporated by reference herein in its entirety for all purposes.

FIELD

The present disclosure generally relates pressure regulators, and more specifically to magneto strictive actuated pressure regulators.

BACKGROUND

Aircraft survival systems, such as passenger emergency evacuation and the life support oxygen systems, use the stored pressurized gas in pressurized cylinders. There is a preference for extended service life of the pressurized gas cylinder with low maintenance effort and cost. Typically, the pressurized gas cylinders use valve modules that are directly assembled to the pressurized gas cylinder that include provisions for filling the gas cylinder, preserving the filled gas cylinder, and discharging the pressurized gas. Generally, the valve modules are connected to the pressurized gas cylinder using a threaded interface and static seals at the interface. However, the interface seals and the valve internal seals are prone to have minute leakage causing loss of gas from the cylinder over time. To compensate for the leakage and to replace the compression worn seals with new ones, the current storage system is periodically overhauled and the gas filled to desired levels. This involves considerable maintenance efforts with additional cost for each aircraft and across a fleet of aircraft.

SUMMARY

An actuator is disclosed herein. The actuator includes a drive body including a bottom surface, the bottom surface having a first side and an opposing second side, a magneto strictive material disposed within the drive body and contacting the first side of the bottom surface of the drive body, a solenoid disposed within the drive body and surrounding the magneto strictive material, a drive rod extending through the magneto strictive material and through the bottom surface of the drive body, and a spring disposed adjacent the second side of the bottom surface of the drive body, wherein the drive rod extends through the spring.

In various embodiments, the actuator further includes an actuator body, the actuator body coupled to the drive body and a lifter disposed within the actuator body, the lifter being connected to the drive rod. In various embodiments, the actuator further includes a sleeve disposed within the actuator body and around the lifter and a metal ball configured to lock the sleeve into a first position with respect to the actuator body. In various embodiments, the sleeve and the lifter are configured to slide freely with respect to one another.

In various embodiments, the magneto strictive material contains a terbium-dysprosium-iron ally. In various embodiments, the magneto strictive material contains a nickel-manganese-gallium alloy. In various embodiments, the drive rod includes a flared portion at a first end, the flared portion configured to be moved by the magneto strictive material.

Also disclosed herein is an actuator including a drive body, a solenoid disposed within the drive body, a magneto strictive material magnetically coupled to the solenoid, and a drive rod extending through the magneto strictive material.

In various embodiments, the actuator further includes a body connected to the drive body, a lifter disposed within the body, the lifter connected to the drive rod and configured to be moved by the drive rod, and a spring disposed between the lifter and the drive body. In various embodiments, the actuator further includes a cavity within a sidewall of the body and a sleeve disposed within the body and around the lifter, the sleeve including a metal ball configured to lock into the cavity. In various embodiments, the sleeve is configured to be moved by the lifter in a first direction.

In various embodiments, the body is connected to a pressurized gas bottle, and wherein the sleeve is configured to be moved by the pressurized gas in a second direction that is opposite the first direction. In various embodiments, the actuator further includes a second cavity disposed within the sidewall of the body, wherein the metal ball is configured to lock into the second cavity in response to the sleeve being moved in the second direction by the pressurized gas. In various embodiments, the magneto strictive material has a stretch performance of about 1% to about 1.5%.

Also disclosed herein is a system including a gas bottle including a neck with an opening in the neck, a fracture disk connected to the neck and sealing the neck, and an actuator configured to open the gas bottle. The actuator includes a body having a first end and a second end, the first end connected to the neck of the gas bottle, a drive body connected to the second end of the body, the drive body having a bottom surface, a magneto strictive material disposed within the drive body and contacting the bottom surface of the drive body, a solenoid disposed within the drive body and magnetically coupled to the magneto strictive material, and a drive rod extending through the magneto strictive material and through the bottom surface of the drive body.

In various embodiments, the actuator further includes a spring disposed adjacent the bottom surface of the drive body, wherein the drive rod extends through the spring and a lifter coupled to the drive rod, the lifter contacting the spring. In various embodiments, the spring is configured to exert a force on the lifter. In various embodiments, the actuator further includes a sleeve disposed within the body and around the lifter and a metal ball configured to lock the sleeve into a first position with respect to the body.

In various embodiments, the metal ball is configured to lock the sleeve into a second position with respect to the body in response to a pressurized gas being released from the gas bottle. In various embodiments, the magneto strictive material has a stretch performance of about 0.5% to about 8%.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein, according to various embodiments, is an actuator for use with a pressurized gas bottle that prevents pressurized gas within the gas bottle from leaking out of the gas bottle. In various embodiments, the actuator is coupled to the gas bottle to prevent pressurized gas from being released from the gas bottle. In various embodiments, the actuator is coupled to the gas bottle enabling the gas bottle to be refilled and/or pressurized after releasing the pressurized air from the gas bottle.

In various embodiments, as disclosed herein, the actuator includes a solenoid, a magneto strictive material, and a drive rod to maintain the seal of the pressurized gas bottle and to open the pressurized gas bottle. In various embodiments, the drive rod extends through the magneto strictive material and into the actuator. In various embodiments, the solenoid surrounds the magneto strictive material. In various embodiments, the drive rod may be further coupled to a lifter and/or sleeve to provide a downward pressure on a fracture disk welded to an opening of the gas bottle. A downward pressure from the lifter and/or sleeve may provide an equalizing force to an upward pressure from the pressurized gas. In various embodiments, this equalizing force prevents the pressurized gas from leaking out the gas bottle.

In various embodiments, the solenoid is energized by a DC power source. The solenoid generates a magnetic field in response to being energized by the DC power source. In various embodiments, the magnetic field aligns the molecules of the magneto strictive material, causing the magneto strictive material to stretch, or elongate. In various embodiments, the actuator prevents the magneto strictive material from elongating in a downward direction, therefore the magneto strictive material elongates in an upward direction. In various embodiments, the elongation of the magneto strictive material provides an upward force on the drive rod, causing the drive rod to move upward, thereby releasing the downward force on the gas bottle, and more specifically, on the fracture disk.

In various embodiments, the pressurized gas in the gas bottle ruptures the fracture disk in response to the downward force of the drive rod being removed. In various embodiments, lifter and/or sleeve are forced upward by the pressurized gas leaving the gas bottle. The pressurized gas may exit the actuator through an opening in the actuator. In various embodiments, the solenoid may be energized for a short period of time such as for about 0.5 seconds to about 1 second. In various embodiments, the lifter and/or sleeve may further include a locking mechanism to lock the actuator in an open position to allow the pressurized gas to exit the gas bottle.

Figure 1:
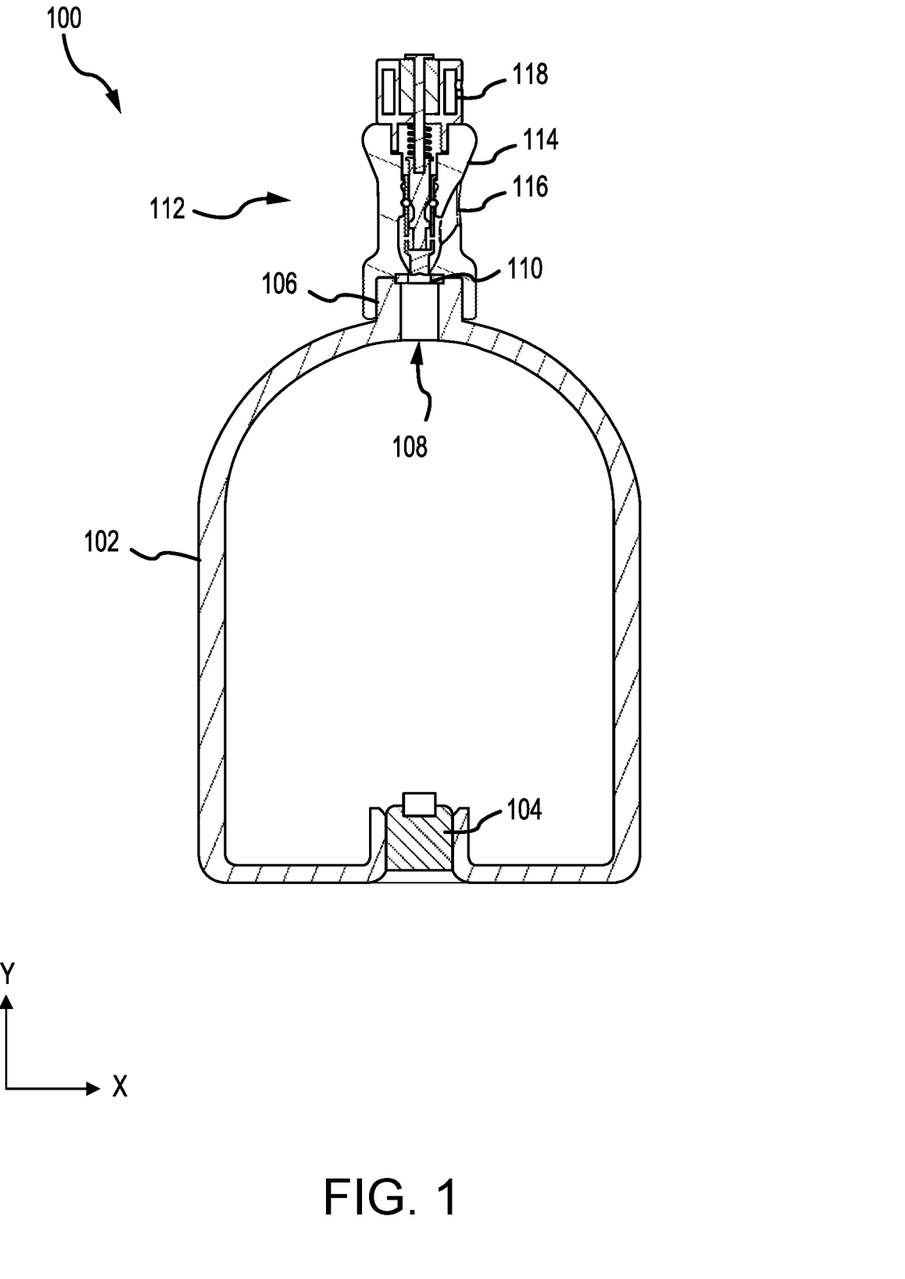
FIG. 1 illustrates a pressurized gas bottle and actuator system, in accordance with various embodiments.

Referring now to FIG. 1, in accordance with various embodiments, a cross section of a hermetically sealed gas bottle system 100 is illustrated. System 100 includes a gas bottle 102 having a fill valve 104 located in the bottom region (e.g., the negative y-direction), a neck 106 including an opening 108 in the top region (e.g., the y-direction), and a fracture disk 110. Fill valve 104 may be welded to gas bottle 102 and be in an open state prior to filling gas bottle 102. After filling gas bottle 102 becomes pressurized, closing fill valve 104 and sealing gas bottle 102. Fracture disk 110 may be welded within neck 106, and more specifically within opening 108, to prevent the pressurized gas from exiting gas bottle 102.

Gas bottle 102 filled and pressurized with gas may be referred to as a hermetically sealed type of gas bottle. Generally, a complete hermetic sealing of the stored and pressurized gas within gas bottle 102 is achieved with little to no maintenance to prevent leaks. Fracture disk 110 may be a thin metallic disk that is either cold welded or fusion welded directly or indirectly to gas bottle 102. Gas bottle 102 is then filled to desired pressure level using fill valve 104. Fill valve 104 is then sealed closed, achieving a hermetically sealed gas bottle 102. It is understood that there may be other ways to achieve a hermetically sealed pressurized gas bottle.

An actuator 112 is connected to neck 106 of gas bottle 102. Actuator 112 includes an actuator body 114, including an outlet 116, and a drive rod assembly 118 for activating actuator body 114. In various embodiments, actuator 112 may be threaded and screw onto neck 106 of gas bottle 102. In various embodiments, actuator 112 may be welded to neck 106 of gas bottle 102. Drive rod assembly 118 activates actuator body 114 in response to an electric charge. Actuator body 114 breaks fracture disk 110 allowing the pressurized gas in gas bottle 102 to exit through neck 106, and more specifically opening 108, and through outlet 116.

Figure 2A:
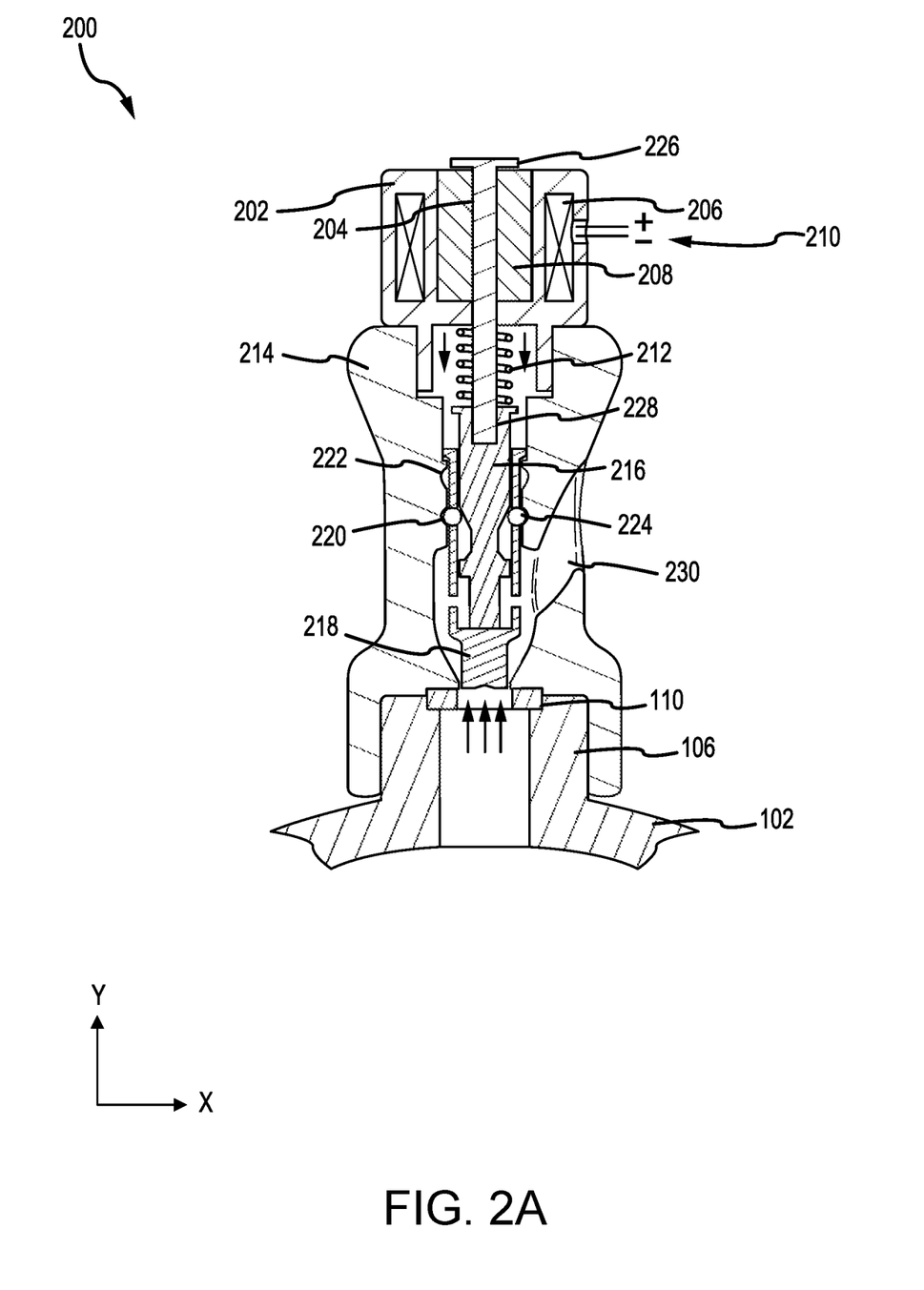
FIGS. 2A and 2B illustrate an actuator for use with a pressurized gas bottle, in accordance with various embodiments.
Figure 2B:
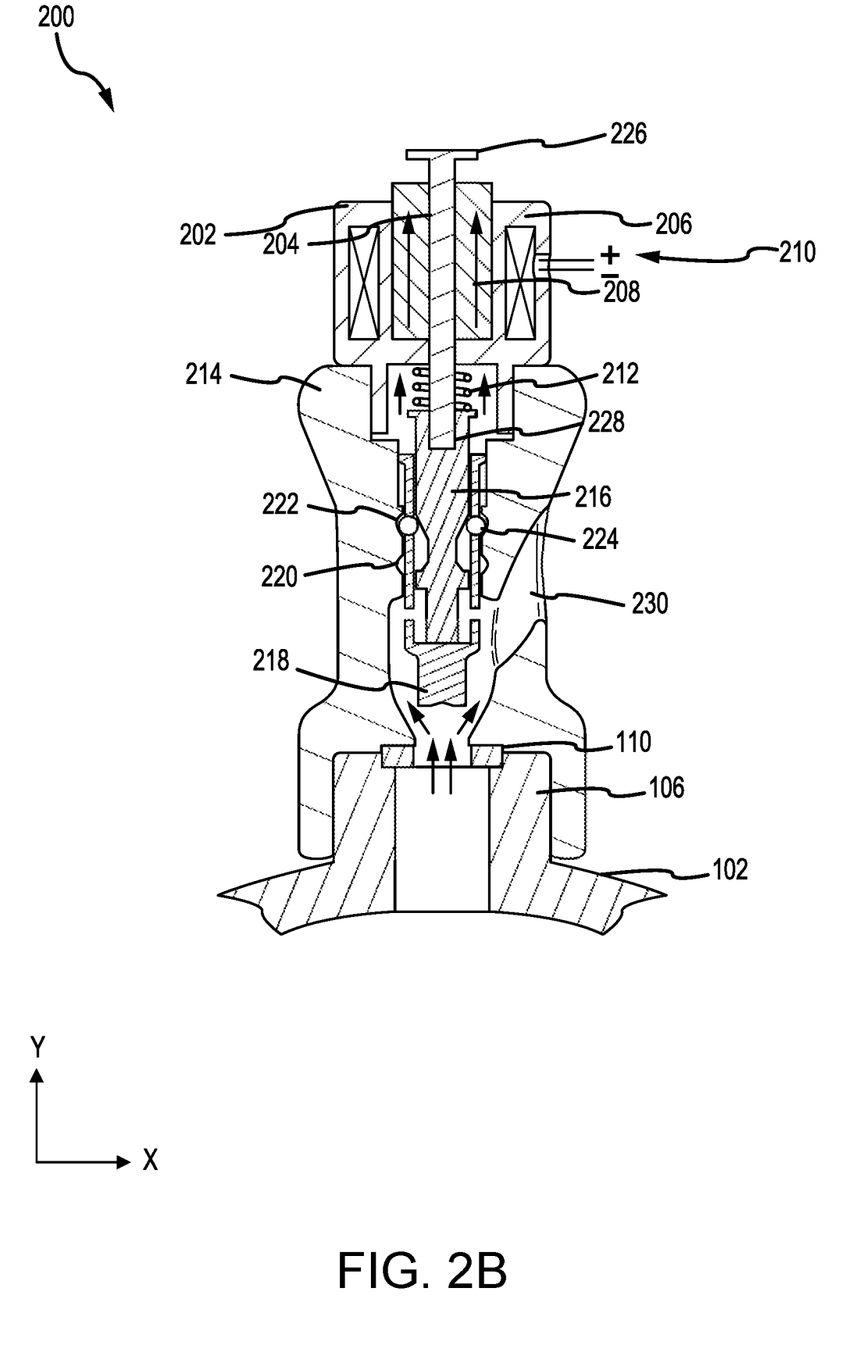

Referring now to FIGS. 2A and 2B, in accordance with various embodiments, a cross section of an actuator 200 for use with a gas bottle 102 is illustrated. Actuator 200 may be an example of actuator 112 described above with respect to FIG. 1. Actuator 200 includes a drive body 202, a drive rod 204, a solenoid 206, a magneto strictive material 208, leads 210, a spring 212, an actuator body 214, a lifter 216, and a sleeve 218. Actuator body 214 further includes a first cavity recess 220 and a second cavity recess 222. Sleeve 218 further includes metallic balls 224 configured to lock into first cavity recess 220 or second cavity recess 222.

Drive body 202 houses solenoid 206, magneto strictive material 208, and a top portion of drive rod 204 (e.g., the y-direction). Magneto strictive material 208 surrounds the top portion of drive rod 204 and includes a hole through which drive rod 204 passes. The top portion of drive rod 204 may have a flared portion 226 to prevent drive rod 204 from passing completely through magneto strictive material 208 (e.g., in the negative y-direction). A bottom portion of drive rod 204 (e.g., the negative y-direction) has a threaded interface 228. Threaded interface 228 of drive rod 204 connects to lifter 216.

As illustrated in FIG. 2A, actuator 200, and more specifically lifter 216 and sleeve 218, is in a down, or closed state. In the closed state, a bottom portion of sleeve 218 (e.g., the negative y-direction) is located adjacent to fracture disk 110 and may be in contact with fracture disk 110. Metallic balls 224 are locked into first cavity recess 220, and spring 212 is elongated, providing a downward force (e.g., in the negative y-direction) onto lifter 216 and sleeve 218. A bottom portion of lifter 216 exerts a downward force (e.g., in the negative y-direction) on sleeve 218, keeping sleeve 218 adjacent to fracture disk 110. Pressurized gas within gas bottle 102 exerts an upward (e.g., in the y-direction) force on fracture disk 110. The force of sleeve 218 against fracture disk 110 balances the force of the pressurized gas within gas bottle 102.

Leads 210 are connected to a power supply and provide power to solenoid 206. A magnetic field is generated by solenoid 206 in response to power being provided by leads 210. The magnetic field causes magneto strictive material 208 to elongate linearly (e.g., in the y-axis), as illustrated in FIG. 2B. A bottom portion of magneto strictive material 208 is supported by drive body 202 and restricts movement of magneto strictive material 208, therefore magneto strictive material 208 elongates and extends in an upward direction (e.g., the y-direction) away from drive body 202. The elongation of magneto strictive material 208 provides a pushing force on drive rod 204, and more specifically, on flared portion 226 of drive rod 204, causing drive rod 204 to translate upward (e.g., in the y-direction).

The upward translation of drive rod 204 pulls lifter 216 upward (e.g., in the y-direction) due to drive rod 204 and lifter 216 being connected by threaded interface 228. The upward translation of lifter 216 compresses spring 212. The movement of lifter 216 releases metallic balls 224, allowing metallic balls 224 to move radially inward and out first cavity recess 220. The downward force (e.g., the negative y-direction) provided by sleeve 218 onto fracture disk 110 is removed in response to the bottom portion of lifter 216 disengaging from sleeve 218. The upward force (e.g., the y-direction) of the pressurized gas within gas bottle 102 ruptures fracture disk 110, forcing sleeve 218 upward (e.g., the y-direction) and locks metallic balls 224 into second cavity recess 222, as illustrated in FIG. 2B. The pressurized gas in gas bottle 102 exits gas bottle 102, through actuator body 214, and out through an outlet 230. In various embodiments, outlet 230 may be coupled to a tube, hose, or other member to further direct the pressurized gas. Solenoid 206 may be de-energized, returning magneto strictive material 208 to its original form while sleeve 218 remains in an open state due to metallic balls 224 being locked in second cavity recess 222.

In various embodiments, magneto strictive material 208 may be a terbium-dysprosium-iron alloy, such as the alloy known in the industry as Terfenol-D. In various embodiments, magneto strictive material 208 may be a nickel-manganese-gallium alloy. In various embodiments, magneto strictive material 208 may have a stretch performance of about 0.5% to about 8%, or about 1% to about 1.5% for some alloys and about 5% to about 6% for other alloys. That is, magneto strictive material 208 elongates to a length about 0.5% to about 8% longer than its initial state in response to a magnetic field.

Figure 3A:
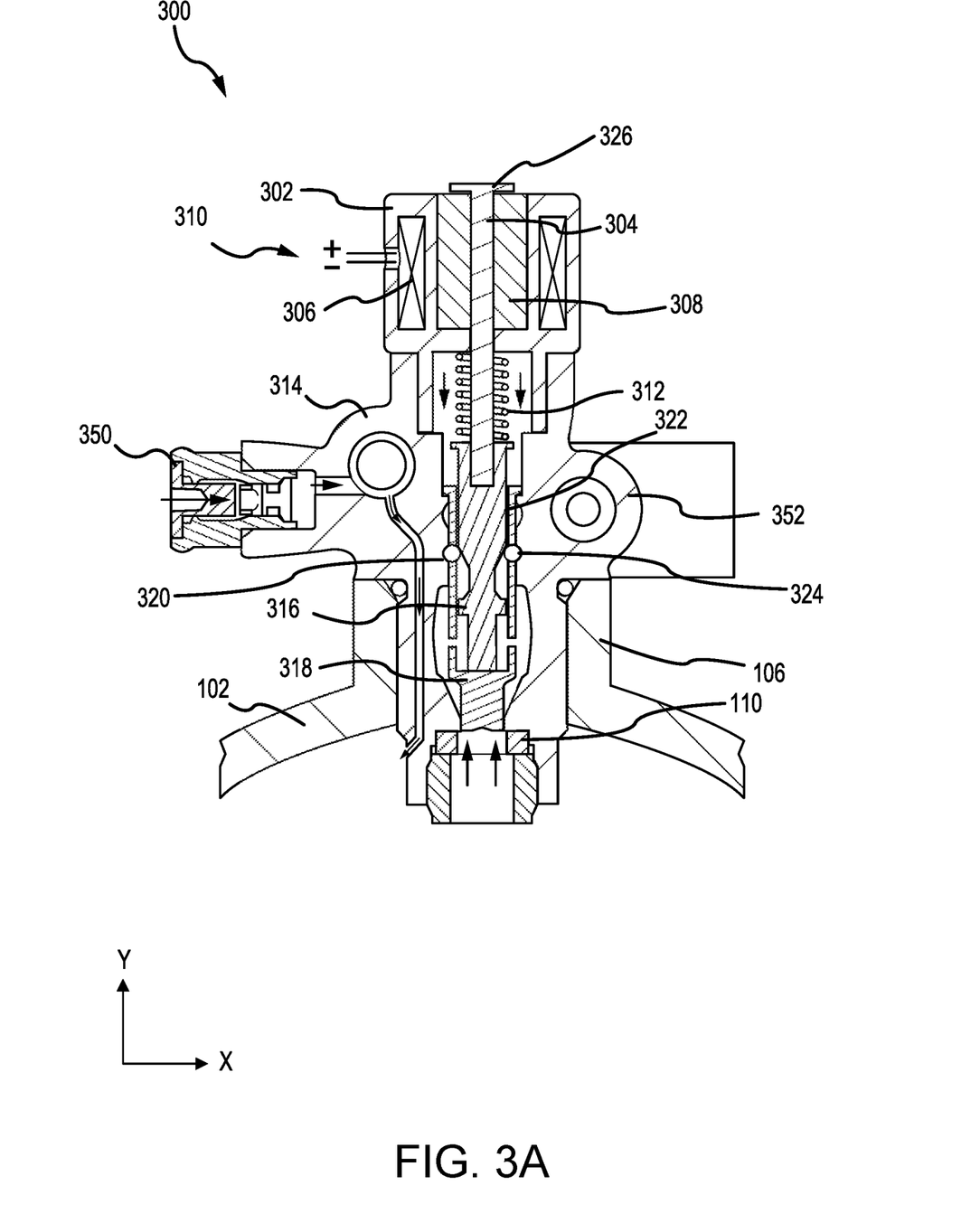
FIGS. 3A and 3B illustrate an actuator for use with a pressurized gas bottle, in accordance with various embodiments.
Figure 3B:
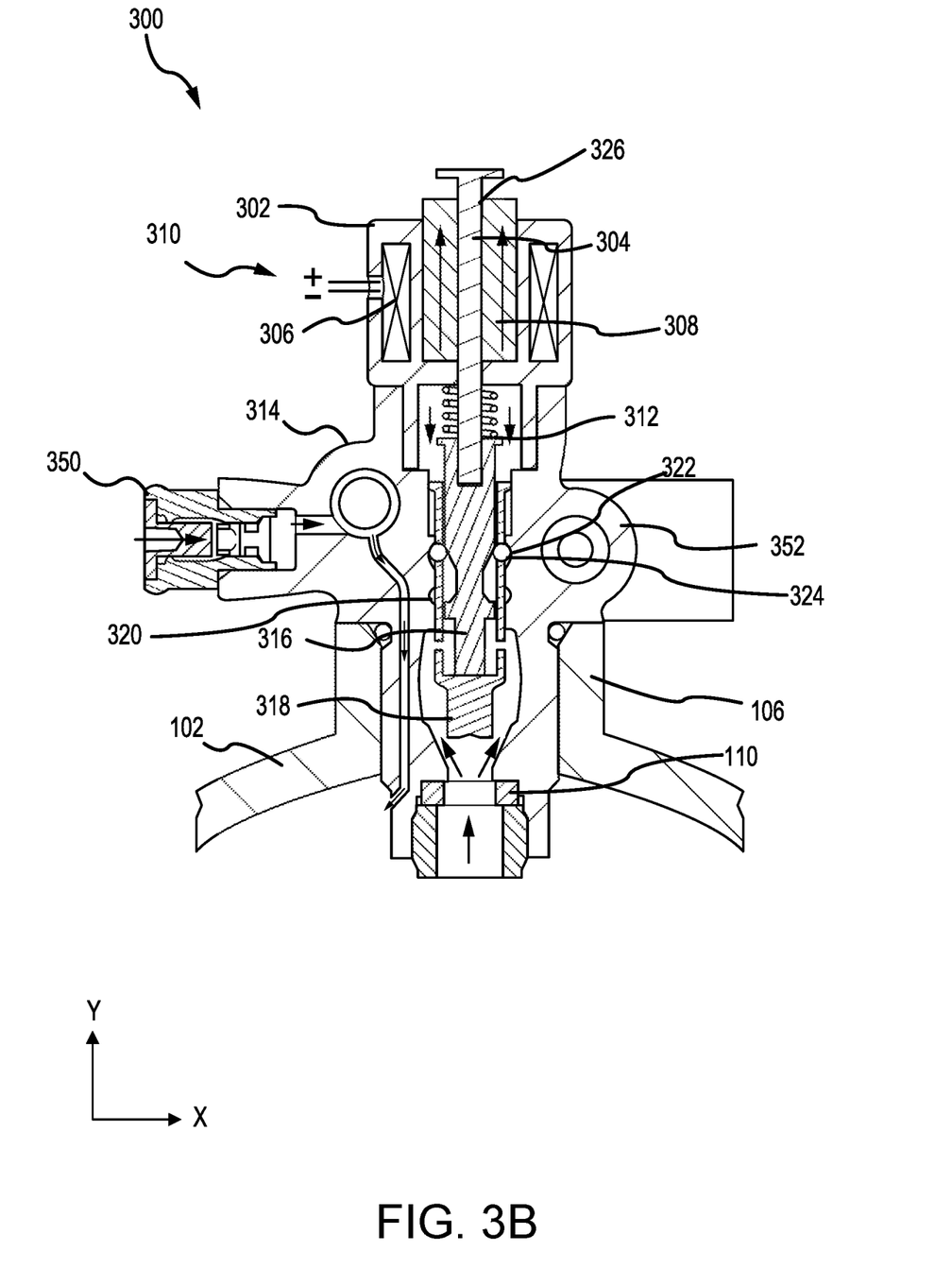

Referring now to FIGS. 3A and 3B, in accordance with various embodiments, a cross section of an actuator 300 for use with a gas bottle 102 is illustrated. Actuator 300 may be an example of actuator 112 described above with respect to FIG. 1. Actuator 300 includes similar components to actuator 200 described above with respect to FIGS. 2A and 2B, including a drive body 302, a drive rod 304, a solenoid 306, a magneto strictive material 308, leads 310, a spring 312, an actuator body 314, a lifter 316, and a sleeve 318. Actuator body 314 further includes a first cavity recess 320 and a second cavity recess 322. Sleeve 318 further includes metallic balls 324 configured to lock into first cavity recess 320 or second cavity recess 322. Various features of actuator 300 that are described above with respect to actuator 200 and FIGS. 2A and 2B may not be repeated below in the description of actuator 300. Actuator 300 further includes a fill valve 350 and a cavity 352 for housing a pressure regulator. In various embodiments, gas bottle 102 may be filled using fill valve 350.

As illustrated in FIG. 3A, actuator 300 is in a closed, or down, state, as described above with respect to FIG. 2A. In the closed state, actuator 300 maintains a pressure equilibrium between pressurized gas in gas bottle 102 and sleeve 318 of actuator 300. This pressure equilibrium allows pressurized gas to be stored in gas bottle 102 with little to no gas leaking from gas bottle 102. Leads 310 provide power to solenoid 306. Solenoid 306 generates a magnetic field in response to being energized by power received through leads 310. Magneto strictive material 308 elongates, extending upward (e.g., in the y-direction) in response to the magnetic field generated by solenoid 306, as illustrated in FIG. 3B. The elongation of magneto strictive material 308 provides a pushing force on drive rod 304, and more specifically, on flared portion 326 of drive rod 304, causing drive rod 304 to translate upward (e.g., in the y-direction).

As magneto strictive material 308 elongates, it exerts an upward force (e.g., the y-direction) on drive rod 304 which in turn exerts an upward force on lifter 316 causing lifter 316 to move upward. The pressure equilibrium is disrupted by lifter 316 move upward (e.g., the y-direction). The force exerted on fracture disk 110 by the pressurized gas in gas bottle 102 causes fracture disk 110 to break, or rupture. The pressurized gas forces sleeve 318 upward (e.g., the y-direction) causing metallic balls 324 to move from first cavity recess 320, as illustrated in FIG. 3A, and to lock in place in second cavity recess 322, as illustrated in FIG. 3B. With sleeve 318 locked in the open, or up, state, the pressurized air in gas bottle 102 can exit gas bottle 102 through actuator 300 and out through the pressure regulator in cavity 352.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An actuator, comprising:
   a drive body including a bottom surface, the bottom surface having a first side and an opposing second side;
   a magneto strictive material disposed within the drive body with a first end of the magneto strictive material contacting the first side of the bottom surface of the drive body and with a second end of the magneto strictive material opposite the first end remaining unobstructed by the drive body such that the magneto strictive material is configured to extend away from and out through a top surface of the drive body;
   a solenoid disposed within the drive body and surrounding the magneto strictive material;
   a drive rod extending through the magneto strictive material and through the bottom surface of the drive body; and
   a spring disposed adjacent the second side of the bottom surface of the drive body, wherein the drive rod extends through the spring.

2. The actuator of claim 1, further comprising:
   an actuator body, the actuator body coupled to the drive body; and
   a lifter disposed within the actuator body, the lifter being connected to the drive rod.

3. The actuator of claim 2, further comprising:
   a sleeve disposed within the actuator body and around the lifter; and
   a metal ball configured to lock the sleeve into a first position with respect to the actuator body.

4. The actuator of claim 3, wherein the sleeve and the lifter are configured to slide freely with respect to one another.

5. The actuator of claim 1, wherein the magneto strictive material contains a terbium-dysprosium-iron alloy.

6. The actuator of claim 1, wherein the magneto strictive material contains a nickel-manganese-gallium alloy.

7. The actuator of claim 1, wherein the drive rod includes a flared portion at a first end, the flared portion configured to be moved by the magneto strictive material.

8. An actuator, comprising:
   a drive body;
   a solenoid disposed within the drive body;
   a magneto strictive material magnetically coupled to the solenoid and disposed within the drive body with a first end of the magneto strictive material contacting the first side of the bottom surface of the drive body and with a second end of the magneto strictive material opposite the first end remaining unobstructed by the drive body such that the magneto strictive material is configured to extend away from and out through a top surface of the drive body; and
   a drive rod extending through the magneto strictive material.

9. The actuator of claim 8, further comprising:
a body connected to the drive body;
a lifter disposed within the body, the lifter connected to the drive rod and configured to be moved by the drive rod; and
a spring disposed between the lifter and the drive body.

10. The actuator of claim 9, further comprising:
a cavity within a sidewall of the body; and
a sleeve disposed within the body and around the lifter, the sleeve including a metal ball configured to lock into the cavity.

11. The actuator of claim 10, wherein the sleeve is configured to be moved by the lifter in a first direction.

12. The actuator of claim 11, wherein the body is connected to a pressurized gas bottle, and wherein the sleeve is configured to be moved by the pressurized gas in a second direction that is opposite the first direction.

13. The actuator of claim 12, further comprising:
a second cavity disposed within the sidewall of the body, wherein the metal ball is configured to lock into the second cavity in response to the sleeve being moved in the second direction by the pressurized gas.

14. The actuator of claim 8, wherein the magneto strictive material has a stretch performance of about 1% to about 1.5%.

15. A system, comprising:
a gas bottle including a neck with an opening in the neck;
a fracture disk connected to the neck and sealing the neck; and
an actuator configured to open the gas bottle, the actuator including:
  a body having a first end and a second end, the first end connected to the neck of the gas bottle;
  a drive body connected to the second end of the body, the drive body having a bottom surface;
  a magneto strictive material disposed within the drive body with a first end of the magneto strictive material contacting the bottom surface of the drive body and with a second end of the magneto strictive material opposite the first end remaining unobstructed by the drive body such that the magneto strictive material is configured to extend away from and out through a top surface of the drive body;
  a solenoid disposed within the drive body and magnetically coupled to the magneto strictive material; and
  a drive rod extending through the magneto strictive material and through the bottom surface of the drive body.

16. The system of claim 15, wherein the actuator further comprises:
a spring disposed adjacent the bottom surface of the drive body, wherein the drive rod extends through the spring; and
a lifter coupled to the drive rod, the lifter contacting the spring.

17. The system of claim 16, wherein the spring is configured to exert a force on the lifter.

18. The system of claim 16, wherein the actuator further comprises:
a sleeve disposed within the body and around the lifter; and
a metal ball configured to lock the sleeve into a first position with respect to the body.

19. The system of claim 18, wherein the metal ball is configured to lock the sleeve into a second position with respect to the body in response to a pressurized gas being released from the gas bottle.

20. The system of claim 15, wherein the magneto strictive material has a stretch performance of about 0.5% to about 8%.

* * * * *